(12) United States Patent
Mochizuki et al.

(10) Patent No.: US 7,969,679 B2
(45) Date of Patent: Jun. 28, 2011

(54) SERVO AREA TEST METHOD OF A MAGNETIC RECORDING MEDIUM AND A TEST DEVICE

(75) Inventors: Hideki Mochizuki, Kodama-gun (JP); Yoshihiro Sakurai, Kodama-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/693,542

(22) Filed: Jan. 26, 2010

(65) Prior Publication Data

US 2010/0195244 A1 Aug. 5, 2010

(30) Foreign Application Priority Data

Feb. 3, 2009 (JP) ................................. 2009-022323

(51) Int. Cl.
*G11B 27/36* (2006.01)

(52) U.S. Cl. ....................................................... 360/31

(58) Field of Classification Search .................... 360/31, 360/32, 39, 40, 48, 51, 77.04, 77.08, 75; 324/212
See application file for complete search history.

(56) References Cited

U.S. PATENT DOCUMENTS

| | | | | |
|---|---|---|---|---|
| 4,536,809 | A * | 8/1985 | Sidman | 360/77.04 |
| 7,209,313 | B2 * | 4/2007 | Tagami | 360/77.08 |
| 7,612,961 | B2 * | 11/2009 | Yamamoto | 360/48 |
| 7,848,039 | B2 * | 12/2010 | Moser et al. | 360/48 |
| 7,848,040 | B2 * | 12/2010 | Yamamoto | 360/48 |
| 7,888,930 | B2 * | 2/2011 | Ichikawa et al. | 324/212 |
| 7,889,451 | B2 * | 2/2011 | Kawabe | 360/51 |
| 2009/0244750 | A1 * | 10/2009 | Shibano | 360/25 |
| 2010/0079900 | A1 * | 4/2010 | Nakamura et al. | 360/75 |
| 2010/0123973 | A1 * | 5/2010 | Ozawa et al. | 360/77.08 |
| 2010/0149673 | A1 * | 6/2010 | Ichikawa et al. | 360/31 |

FOREIGN PATENT DOCUMENTS

| | | |
|---|---|---|
| JP | 2007-12119 A | 1/2007 |
| JP | 2007-149155 A | 6/2007 |
| JP | 2008-171507 A | 7/2008 |
| JP | 2008-176835 A | 7/2008 |

* cited by examiner

*Primary Examiner* — Fred Tzeng
(74) *Attorney, Agent, or Firm* — Mattingly & Malur, P.C.

(57) ABSTRACT

A read signal for one revolution of each of a plurality of tracks jitter of which is cancelled is obtained and a binary-coded image data for the read signal is generated and the track number position of each servo area is specified from the binary-coded image data. Further, a read signal in this position in radial direction is obtained from the track number position of each of the specified servo areas and the servo area is tested by the read signal.

14 Claims, 5 Drawing Sheets

SERVO AREA TEST METHOD OF A MAGNETIC RECORDING MEDIUM AND A TEST DEVICE

TECHNICAL FIELD

This invention relates to a servo area test method of a magnetic recording medium and a test device and, in particular, a servo area test method of a magnetic recording medium with which propriety of a servo area of a magnetic recording medium (discrete track medium (DTM)) of a discrete track system formed from a master disk or a servo area of a bit patterned medium (BPM) in which the discrete track is magnetically divided finely in the track direction can be tested in an electrical test device and a test device.

BACKGROUND ART

The magnetic disk medium of the vertical magnetic memory system is used in a composite magnetic head having a TMR (tunnel magneto-resistance) head or a GMR (giant magneto-resistance) head, which is a memory medium separable from the head by 10 nanometer or less controllably.

Such magnetic disk medium generally includes a glass substrate, a soft magnetic layer formed on the glass substrate and a magnetic layer provided on the soft magnetic layer. Discrete tracks are formed in a discrete substrate by etching the magnetic layer. (Incidentally, the term "disk substrate" is used as a material of a magnetic disk to be mounted on a hard disk.)

The etching for forming grooves between tracks is performed through an uneven photo-resist film. The unevenness of the photo-resist film is formed by using the nano-print lithography and pushing the photo-resist film with an uneven stamper. The track width of the discrete track formed by the dry etching through the uneven photo-resist is 100 nm or less and the groove separating adjacent tracks is filled with a non-magnetic material in a later step. Such kind of the technique is described in JP-2007-012119A and JP-2007-149155A, etc.

In this vertical magnetic recording medium, a data area and a servo area are separated and a servo information for a track positioning of the magnetic head area and a track number, etc., are provided. In the original disk which becomes an unevenness stamper, unevenness for forming a servo area is provided, the data area and the servo area are formed in the disk medium and the servo information, etc., are set. Such kind of test technique is described in, for example, JP-2008-176835A and is well known.

The test of the data area in such kind of vertical magnetic recording medium is performed by recording of bit signal data, in which "010101 . . . ", for example, is repeated, and reading the data. Since a level of the read signal is changed correspondingly to a change point of the changing magnetization from "0" to "1" or "1" to "0" in such test, there are jitter noise test for testing transition position of a regeneration waveform signal corresponding to the change point of magnetization similarly to the conventional horizontal recording disk test and the T50 noise test for performing a test for regeneration waveform width in ±50% level, etc. The technique of such kind is described in JP-2008-171507A and is well known.

Figure 7:
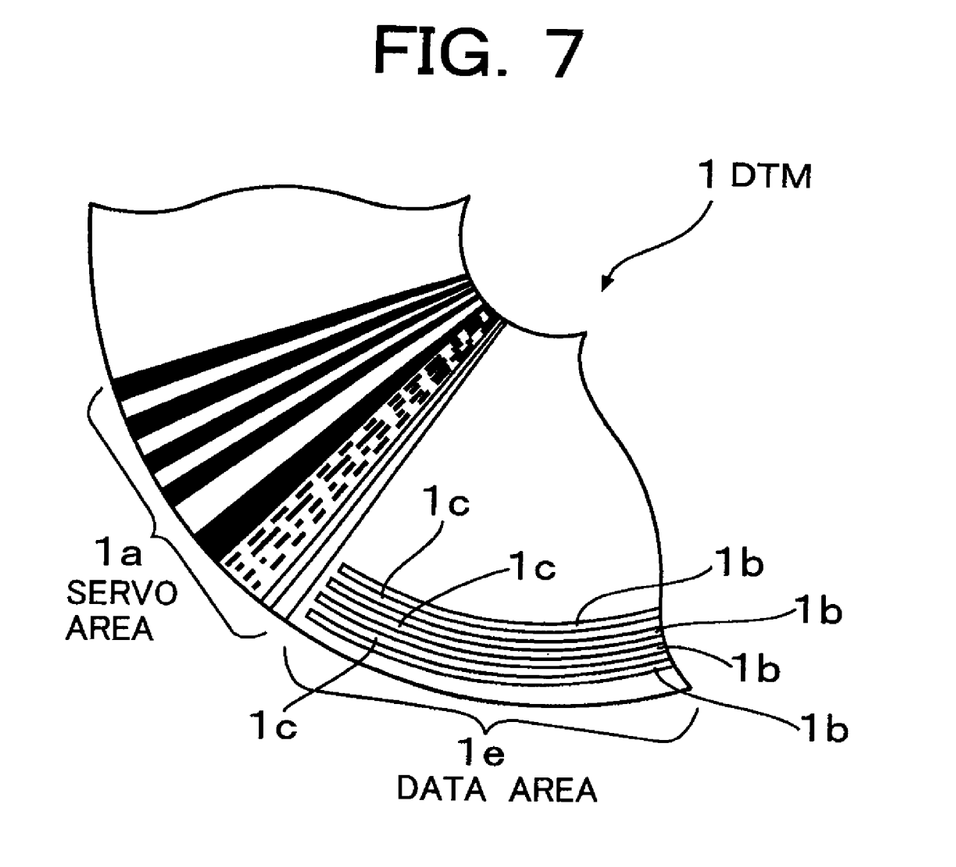

FIG. 7 shows about one fourth of a DTM 1 to be tested.

In the DTM 1, servo area 1a corresponding to respective sectors. In the servo area 1a, a track number, servo information (servo burst signal) for positioning ON track positioning and sector number are recorded. After the servo areas, a data area 1e in which respective discrete track 1b is provided is formed. Each of non-magnetic members 1c is provided between adjacent discrete tracks 1b.

The servo area 1a and the data area 1e are provided in each sector and the number of sectors is usually about 256 for one track.

Incidentally, FIG. 7 shows an enlarged schematic depiction of the servo area 1a and the data area for the purpose of description.

A DTM is currently paid attention as a technique capable of realizing ultra high density recording exceeding 1 terabit/(inch)$^2$ for 2.5 inches several years later. Further, the bit patterned medium (BPM) having discrete tracks, which are finely separated magnetically in the track direction, has been entered into the practical implementation step recently.

However, since the information of the servo area is not the repeating bit pattern such as "010101 . . . " of the data area, it is difficult to apply the electric test in the data area of such as the jitter noise test, etc., to the servo area for the reason that change of the bit density of a read signal influences when a relative comparison is performed by setting a constant slice level. Therefore, it is usual to perform the test of whether or not a servo area is formed in the DTM correctly with respect to the original disk by a video test, etc., by an optical photographing.

However, in such video test, the load of image processing of the data processing device becomes higher and the throughput of the test processing becomes lower when the recording density becomes higher.

SUMMARY OF THE INVENTION

In order to solve the problem of the prior technique, an object of this invention is to provide a test method for testing a servo area of a magnetic recording medium which can test a propriety of a servo area of a magnetic recording medium electrically and, in particular, is suitable to test a servo area of a magnetic recording medium stamped from an original disk, and a test device therefor.

The servo area test method of a magnetic recording medium of the present invention which can achieve this object comprises the steps of positioning a magnetic head in a designated and DC erased track of a rotating magnetic recording medium, moving the magnetic head in a radial direction of the magnetic recording medium cross a plurality of DC erased tracks including the designated DC erased track, moving the magnetic head in a radial direction of the magnetic recording medium across a plurality of DC erased tracks including the designated track and reading a signal for one track revolution by the magnetic head according to a read start signal corresponding to respective moving position in the radial direction, A/D converting the read signal for the one track revolution to a digital value and storing the digital value in a memory correspondingly to the respective moving positions in the radial direction, obtaining the read signal for the revolution of a plurality of the tracks from the memory and canceling jitter in the track direction of each of the read signals corresponding to the respective servo areas of one track revolution in the read signals for the plurality of track revolutions, binary-coding the read signal for each track revolution, jitter of which is cancelled, by a designated slice level and generating a binary image data an image of which has one axis corresponding to the moving position in the radial direction and the other axis corresponding to a circumferential direction of the magnetic recording medium, detecting, from the binary image data, a position of the track number in each servo area, and testing each servo area by judging a defect of the servo area on the basis of the read signal in radial direction which is stored in the memory correspondingly to the least significant bit of at least the track number in the position of the track number in each of the servo areas.

In this invention, the binary coded image data of the read signal for one track revolution of a plurality of tracks with jitter cancelled is generated and the track number position of the servo areas are specified by the binary coded image data. Further, the read signal in radial direction in the track number position of specified each servo area is obtained and the servo area is tested by the read signal.

In concrete, by moving the magnetic head in a radial direction of the magnetic recording medium across a plurality of DC erased tracks, the read signal for one track revolution is obtained and, by canceling jitter of each read signal in track direction every servo area, the binary coded image data having one axis corresponding to the radial direction and the other axis in circumferential direction is generated. A defect judgment of the read signal in the radial direction is made by detecting the position of the track number in a servo area from the binary coded image and referring to the read signal in radial direction corresponding to the least significant bit of at least the track number in the position of the track number in each of the servo areas.

By such test, the defect of servo area of DTM, BPM or other magnetic recording medium having a recording layer of uneven pattern is tested.

The track number in a servo area becomes a magnetic film arrangement of a repetition of "0" and "1" bits along the read signal in radial direction. The electrical test becomes possible similarly to the data area of the repeating bits "010101 ...".

That is, the signal including alternate bits "0" and "1" can be obtained along the read signal in radial direction in the position of the track number in circular direction. In particular, since the position of the least significant bit of the track number corresponds to an area in which inverted magnetic films of narrow width are arranged, the repeating frequency of "0" and "1" bits of the read signal is high. Therefore, defect is easily occur in the least significant bit position in the servo area formed by stamping from the original disk and the test of servo area can be done by using the read signal in at least this area.

Since, in other regions of the servo area, the inversion width of the magnetic films stamped from the original disk is large and defect hardly occurs, it can be said that the substantial servo area is tested by testing the read signal in radial direction corresponding to at least the least significant bit of the track number.

It is of course better to test all of positions of the track number including the least significant bit.

As a result, since, in this invention, the test of the servo area is performed for the read signal in radial direction which is the repeated bit pattern of "0" and "1", the change of bit density is not influenced even when the electric test is performed. Since the defect test can be performed for the read signal for the plurality of track revolutions by setting a constant slice level, it is possible to test the servo area by the electric test device. Therefore, it is possible to easily realize the servo area test method and the test device of a magnetic recording medium. In particular, the test method and the test device which are suitable for the test of servo area of a magnetic recording medium stamped from the original disk can be realized.

DESCRIPTION OF THE PREFERRED EMBODIMENT

Figure 1:
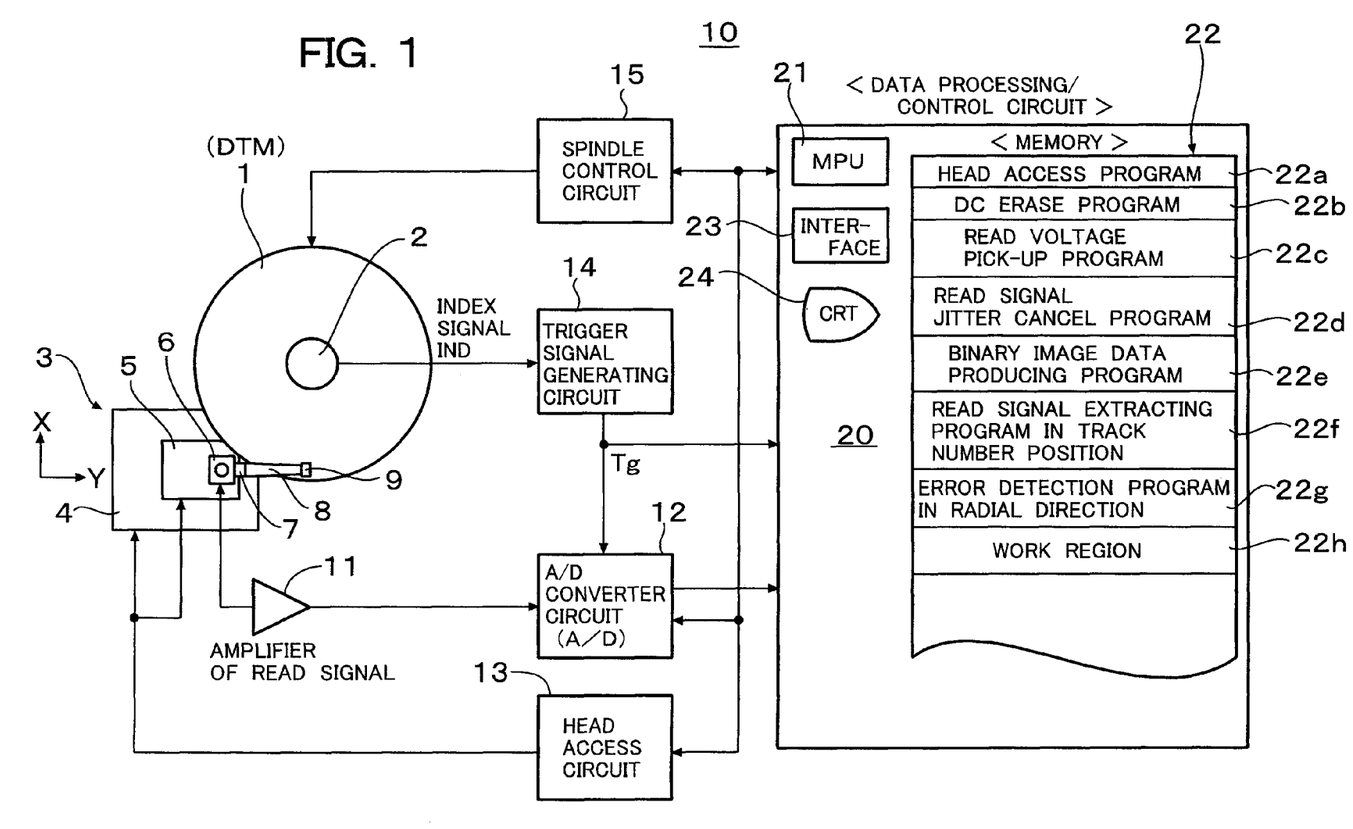
FIG. 1 shows a block diagram of a servo area test of a magnetic recording medium according to an embodiment of this invention.

In FIG. 1, a reference numeral 10 depicts a magnetic disk tester for testing a servo area of a magnetic recording medium, a reference numeral 1 shows a DTM (discrete track medium) which is detachably mounted on a spindle 2. A head carriage 3 is provided adjacent to the spindle 3. The head carriage 3 is constructed with a roughly moving stage 4 and a piezo stage 5. On the piezo stage 5, a composite magnetic head 9 having an MR head (read head) and a thin film inductive head (write head) are mounted.

The rough stage 4 is an XY stage in which the X stage is a stage movable in a radial direction of the DTM 1. The X stage moves the piezo stage 5 in the radial direction of the DTM 1 through the Y stage. The Y stage of the rough stage 4 is mounted on the X stage and moves to the head 9 in order to positional regulation of skew, etc., in Y direction. The piezo stage 5 is mounted on the Y stage to finely regulate the position of the X direction of the head 9.

Incidentally, the X direction coincides with the radial direction passing through a center of the DTM 1.

A cartridge mounting base 6 and a piezo actuator for moving the cartridge in the X direction, etc., are provided on the piezo stage 5 and a head cartridge 7 is mounted thereon through the cartridge mounting base 6.

The head 9 is supported by the head cartridge 7 through ε suspension spring 8 and mounted on a top end side of the suspension spring 8. The head 9 is moved in the radial direction along the X axis direction of the DTM 1 to seek the tracks of the DTM 1, is positioned in one of the tracks and reads data from the track or writes data in the track. That is, the head performs the so-called head access operation.

The head cartridge 7 includes a read amplifier and a write amplifier, etc., and mounts the head 9 on the head cartridge 3. The head 9 is detachably mounted on the head carriage 3 through the head cartridge 7. The read amplifier amplifies a read signal from the MR head and sends the amplified read signal to the amplifier 11 from which the read signal is inputted to an A/D converter circuit 12.

The A/D converter circuit 12 receives a trigger signal Tg from a trigger signal generating circuit 14, starts an A/D conversion in synchronism with every trigger signal Tg, samples the read signal at a designated sampling frequency, for example, a designated frequency within a range from 1 GHz to 10 GHz, which is selected by a data processing/control device 20, and sends a digital value of the voltage value of the read signal to the data processing/control device 20.

Incidentally, it is preferable that the sampling frequency is equal to or more than twice the data frequency of the read signal.

A head access control circuit 13 receives a control signal from the data processing/control device 20 to drive the rough moving stage 4 and the piezo stage 5 to thereby position the head 9 in a designated track position which is aimed.

A trigger signal generating circuit 14 generates a trigger signal by an index signal IND (read start signal) from an encoder provided in the spindle 2. The trigger signal Tg is sent to the A/D 12 and the data processing/control circuit 20. Incidentally, the read start signal may be a sector signal of the read start signal in lieu of the index signal IND.

Under control of the data processing/control device 20, a spindle control circuit 15 controls the number of rotations of the spindle 2 such that a number of rotation of the DTM 1 in a position of the head 9 in a radial direction becomes a designated constant value.

The data processing/control device 20 is constructed with an MPU 21, a memory 22, an interface 23, a CRT display 24 and a keyboard, etc., which are mutually connected by a bus. In the memory 22, a head access program 22a, a DC erase program 22b, a read voltage pick-up program 22c for picking up a read voltage for one track corresponding to a radial position, a read signal jitter cancel program 22d, a binary image data producing program 22e, a read signal extracting program 22f in a track number position and an error detection program 22g in a radial direction, etc., are provided and, further, a work region 22h is provided in the memory.

Figure 2:
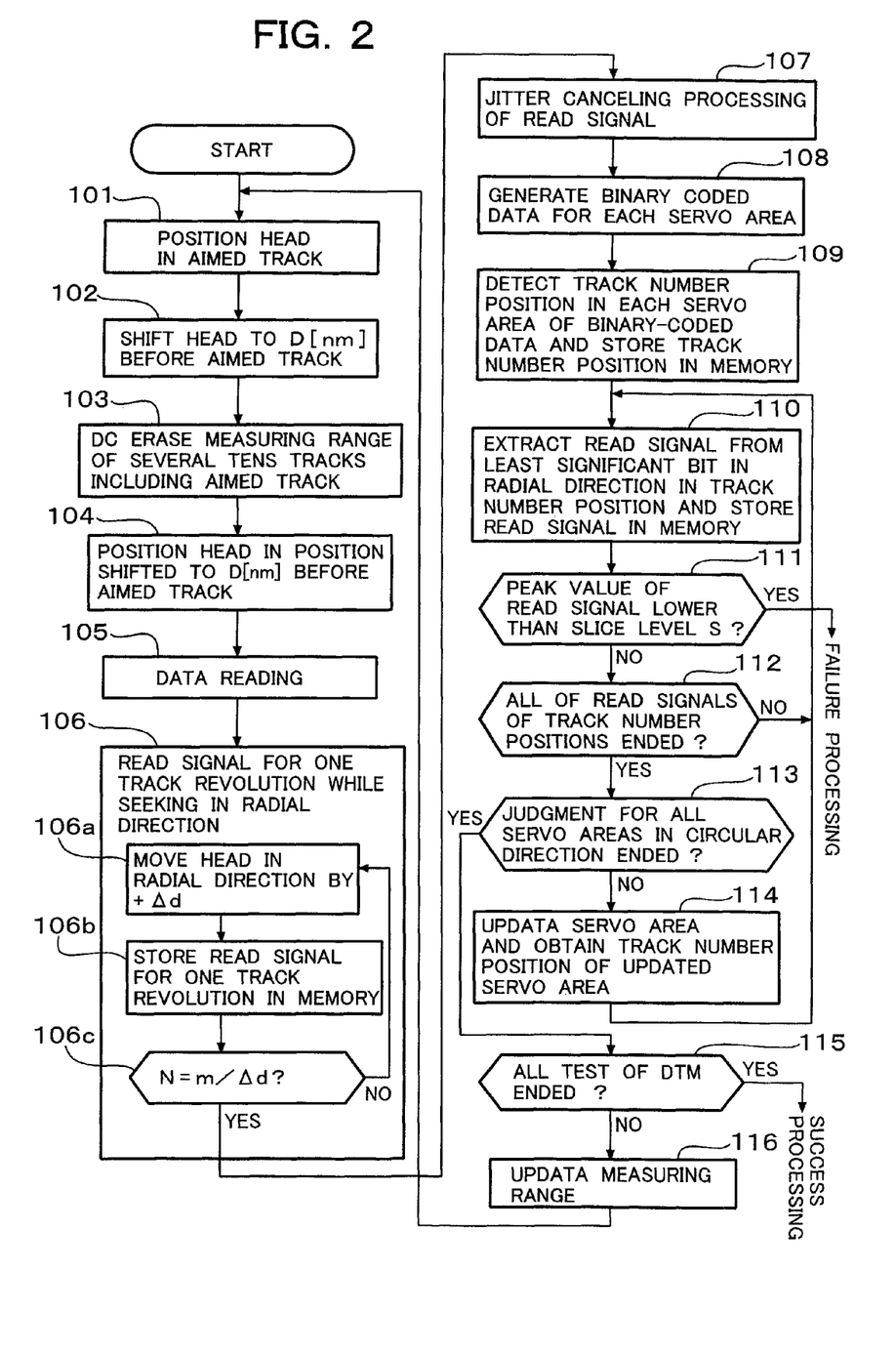
FIG. 2 is a flowchart of the proceeding of a defect test of a servo area.

Next, the test processing of the data processing/control device 20 will be described with reference to the flowchart of the defect test processing of the servo area shown in FIG. 2.

The MPU 21 executes the head access program 22a to set a moving distance r [mm] in the R direction in a designated register of the head access control circuit 13 through the interface 23 to thereby start the head access control circuit 13.

When the moving distance r [mm] in the R direction is set in the register, an X stage of the rough movement stage 4 is driven for r [mm] from a reference point or a designated track position by the head access control circuit 13 and the piezo stage 5 is driven such that the head 9 is finely moved by a distance r and positioned in an aimed track (Step 101). Therefore, the head 9 is positioned from the reference point or the designated track position.

Then, the MPU 21 sets a moving distance −D [nm] in the R direction in a designated register of the head access control circuit 16 through the interface 23. With this setting of the moving distance −D [nm] in the R direction, the piezo actuator 5 is driven by the head access control circuit 16 to shift the head 9 to a position which is close to the aimed track by D [nm] (Step 102).

Then, the MPU21 executes the DC erase program 22b and DC erases of an area within the measuring range for several tens tracks from the near side D[nm] to the aimed track (Step 103). This DC erasure is performed by writing data "0" in the whole measuring range (respective tracks and between tracks). Therefore, the area of the magnetic film of the servo area is magnetized by, for example, the S pole.

Incidentally, the DC erasure may be performed by writing data "1" in the whole measuring range. In such case, the area of the magnetic film of the servo area is magnetized by the N pole.

Then, the MPU 21 positions the head 9 in a position near the aimed track shifted from the center of the aimed track by −D[nm] (Step 104).

Then, the MPU 1 calls and executes the read voltage pick-up program 22c for one track corresponding to the radial position and enters into the data read state by the MR head (read head) (Step 105). And, the read processing for one track is performed while seeking in the radial direction (Step 106).

In this operation, the MPU 1 memories the read voltage of one track in a period from the trigger signal Tg received from the A/D 12 to a next trigger signal Tg in the memory 22 correspondingly to the radial position of the head.

That is, in the processing in Step 106, when the initial track is read, the MPU 21 skips the Step 106a which is to be described later and enters into the Step 106b and, then, returns to the Step 106a through the Step 106c. Thereafter, the head 9 is moved in the radial direction by +Δd nm (Δd<<D) (Step 106a), the read signal for one track, which is A/D converted by the A/D 12, is stored in a designated area of the memory 22 (Step 106b) and an end of a measuring range is determined when the number N of movement is m/Δd (Step 106c). When N is not equal to m/Δd in Step 106c, the operation is returned to the Step 106a. This processing is repeatedly performed. The MPU 21 repeats this processing until the head 9 is moved in the radial direction for several tens tracks corresponding to the measuring range.

Incidentally, m is a moving distance of the head 9 for several tens tracks, m/Δd is a number of movements to a distance m. Δd is 10 nm, for example, and it is preferable that AΔ is selected from a range 5 nm to 20 nm.

Therefore, the MPU 21 can collect data of read voltage for a number of tracks in the radial direction by repeatedly reading several tens tracks while seeking the head 9 in the radial direction from a front side of the aimed track to a rear side of the aimed track.

Figure 3:
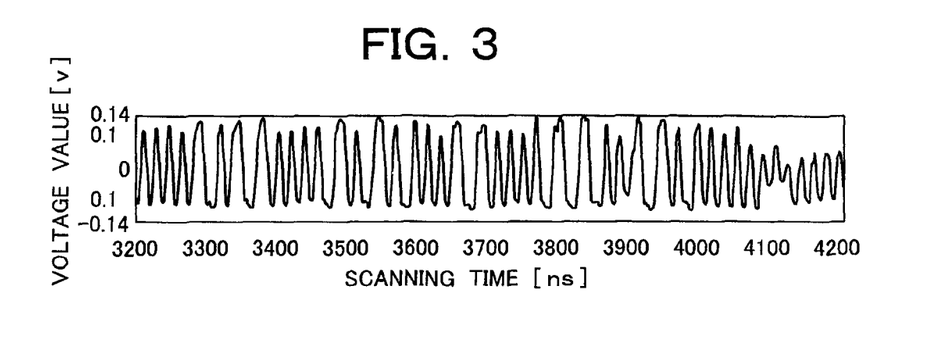
FIG. 3 shows a read waveform of a servo area in a certain radial position.

FIG. 3 shows a read waveform of a servo area in a certain radial position. An ordinate is voltage value and abscissa is a scanning time. The read signal for one track includes 256 read waveforms obtained in the sectors usually and one of which is shown in FIG. 3.

The 256 read voltage waveforms for one track revolution are stored in the working region 22h of the memory 22 correspondingly to the radial positions in which the head 9 is positioned.

Then, the MPU 21 executes the read signal jitter canceling program 22d to coincide timings of read signals by correcting the mutual difference of the respective read signals for one track (Step 107).

Now, the jitter canceling processing will be described with reference to FIG. 4.

Figure 4A:
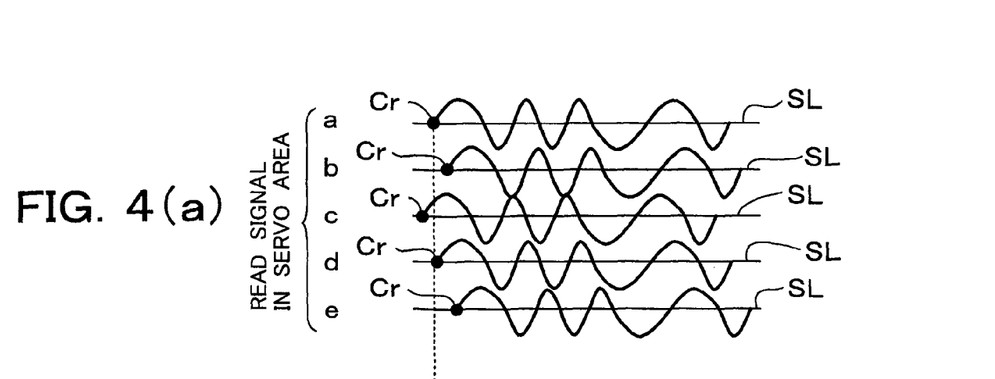
FIG. 4(a) shows read signals before a jitter canceling processing and FIG. 4(b) shows the read signals after the jitter canceling processing.
Figure 4B:
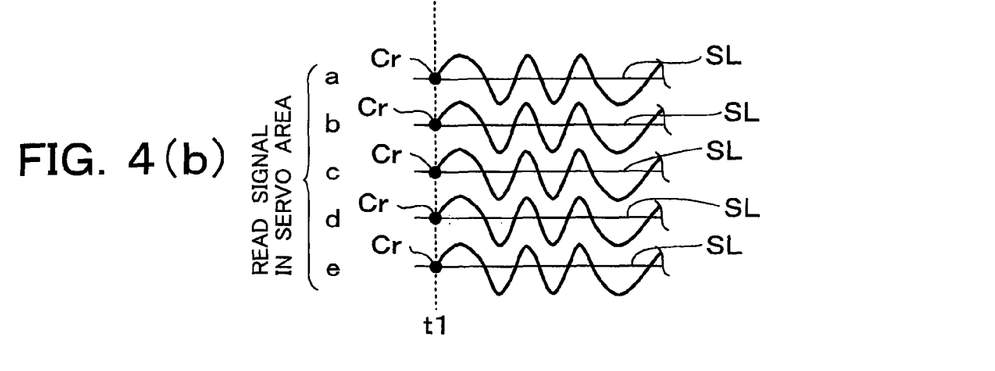

Assuming that the voltage waveforms of the respective read signals of 256 servo areas for one track revolution are a~e shown in FIG. 4(a) and center levels of amplitudes of the read signals a~e in track direction are slice levels SL, the timings of crossing points (zero cross point, that is, transition point) are shifted such that the read signals a~e in this track direction the time axes are moved such that the crossing points Cr of the slice level SL of initial peak waveforms are coincident in the track direction (refer to FIG. 4(b)).

Incidentally, the slice level SL is calculated as a center value of an average value of a positive side peak and a center value of an average value of a negative side peak of the read signal shown in FIG. 3 and calculated with the respective read signal unit in radial direction.

Therefore, as shown in FIG. 4(b), the initial zero crossing point Cr of the slice level SL of the read signal a and initial zero points Cr of slice levels of the read signals b~e becomes coincident at timing t1 to cancel the deviation of the respective read signals in track direction (circumferential direction of DTM 1).

As a result, a jitter in a track direction of each of read signals a~e corresponding to a servo area for a plurality of track revolutions is cancelled in accordance with the read signal a for the one track revolution stored in the memory.

Incidentally, the canceling of jitter is not limited to the coincidence of the zero cross point Cr of the slice level SL of the initially generated peak waveform of the read signal a at the timing t1 with the zero cross points Cr of the slice levels of the initial peak waveforms of the read signals b~e. In lieu of the timing t1, the read signals b~e are set in a preliminarily determined timing. It is possible to set the slice level SL of any one of the read signals a~e in the cross points of the remaining read signals such that the cross points coincident with the slice level of the one read signal. In such case, it is preferable that the setting of timing is initial zero cross point Cr or a zero cross point near the initial zero cross point Cr.

MPU 21 performs such jitter canceling for a servo area for one track revolution for a predetermined number of read signals and for a servo area of respective sectors and, further, the jitter canceling processing is executed for all of the read signals in a measuring range.

Then, MPU 21 executes the binary-coded image data producing program 22e. By this execution, MPU 21 generates binary-coded image data having radial direction as a vertical axis and circumferential direction (rotating direction) of the disk as an axis for each servo area of the respective sectors by binary-coding the read signal for one track revolution, the jitter of which is cancelled, with using either one of the respective slice levels SL as a standard (Step 108).

Incidentally, the binary-coding is performed in order to specify the track number position by the image data and it is preferable that the binary-coded slice level is produced by using the slice level SL as a reference. However, the binary-coded image can be obtained by using a slice level which is in between minimum peak in the positive side and maximum peak in the negative side in FIG. 4(b). Therefore, the slice level for the binary-coding is not limited to the slice level SL.

Figure 5:
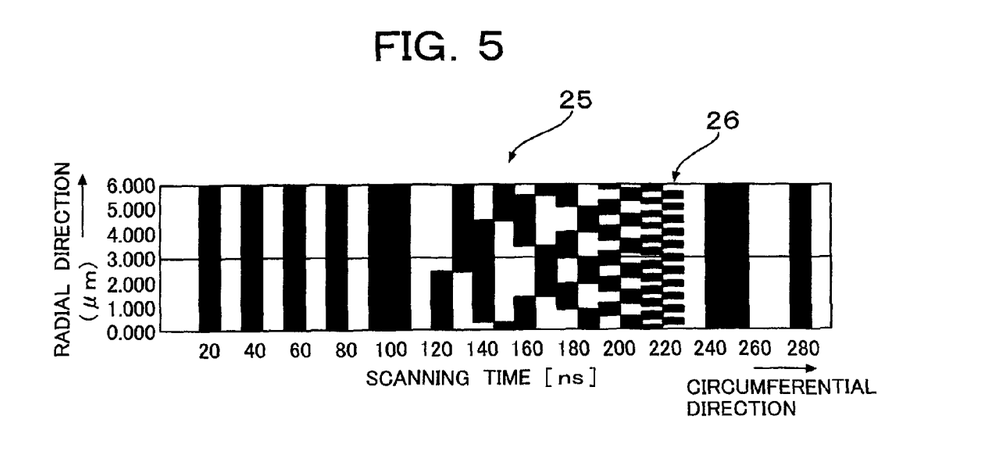
FIG. 5 shows a binary coded image in a track number position in a certain servo area.

FIG. 5 shows a binary-coded image 25 in a track number position in a certain servo area. The binary-coded image 25 is the binary coded image of the track number position represented by the binary-coded image data. In FIG. 5, the ordinate extends in the radial direction and the abscissa is a scanning time.

That is, the binary-coded image 25 of the binary-coded image data has one axis corresponding to the moving position of the head 9 in the radial direction and the other axis corresponding to circumferential direction of DTM 1.

In the binary-coded image 25, the read signal shown by black areas is "0" in the binary-coded image data and the read signal shown by white areas is "1". The black area corresponds to an area which is magnetized by the S pole by writing "0" in the magnetic film.

Since, in the position of the track number in a servo area, the magnetic layer having bits, which repeats "0" and "1" periodically in radial direction, is arranged, this area is displayed as a black and white image in the binary-coded image 25. Incidentally, the widths of the white and black areas are different more or less according to the slice level of the binary-coding.

The extraction of the binary-coded image data corresponding to the binary-coded image 25 in the track number position from the binary-coded image data is performed by detecting an area 26 corresponding to the least significant bit (LSB) in the position of the track number.

As shown in FIG. 5, in the scanning time of the head 9 in the track direction, a rear of the area 26 of LSB in the position of the track number on the binary-coded image data in radial direction becomes only "1". The front area 26 of the LSB includes the repeated bit signal of "010101 . . ." in radial direction in the binary-coded image data. Further, the track number is usually constructed with 16 bits. From these matters, the position of the track number can be specified by the binary-coded image data.

The signal having bit pattern "010101 . . ." is detected by reading the signal on the binary-coded image data in the radial direction corresponding to the radial direction of the binary-coded image 25 in the respective circumferential direction corresponding to the circumferential direction of the binary-coded image 25 while updating the binary-coded image data. The area having the highest frequency among this bit pattern becomes a binary-coded image data corresponding to the area 26 of LSB. The binary-coded image data corresponding to the area 26 is detected on the basis of the above matter and the track number position is detected from the binary-coded image data with the area 26 as a reference and stored in the memory (Step 109).

Then, the MPU 21 executes the read signal extraction program 22f of the track number position to extract, among a number of read signals (the read signals picked up as data) stored in the working region 22h correspondingly to the binary-coded image 25, the read signal corresponding to the track number position in radial direction from the LSB position in the track number position of the read signal in the servo area detected in the binary-coded image data of the binary coded image 25 and stores the read signal in a designated region of the working region 22h of the memory 22 (Step 110).

As shown in FIG. 5, the region of the magnetic film of the servo area corresponding to LSB or a plurality of lower bits in the track number is a region in which the width of the magnetic film is narrow and the bits "0" and "1" are alternately turned and the bit repeating frequency is high. Therefore, the read signal in radial direction of the region of LSB or lower bits corresponding to this is a signal for producing the bit pattern of "010101 . . ." at high frequency similar to the arrangement "010101 . . ." of the data in testing the data area. The servo area is tested by obtained the read signal of the bit pattern "010101 . . ." by extracting the read signal of the position of the track number from the read signals stored in the working region 22h in radial direction.

Then, the MPU 21 executes the error detection program 22g of the read signal in radial direction to acquire the read signal 27 (refer to FIG. 6) from the working region 22h from the LSB position of the track number position among the read signals stored in the working region 22h corresponding to the extracted binary-coded image 25. A decision slice level S (refer to FIG. 6) is set for the read signal 27 thus obtained and it is determined whether the peak value is equal to or lower than the slice level (Step 111). When the peak value is not higher than the slice level in the respective read signals in radial direction of the track number position, the DTM 1 is determined as disqualification and the disqualification processing is performed to store it in a disqualification cassette.

Incidentally, an average of the peak values of the number of read signals in the track number positions in a certain servo area which are extracted in the Step 110, and the slice level S is set to, for example, 90% of the average value.

Figure 6:
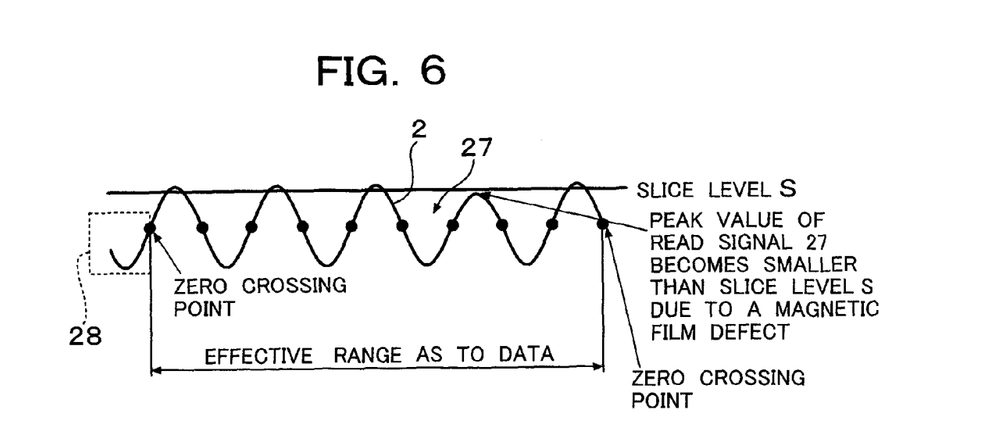
FIG. 6 shows the read signal in radial direction corresponding to the least significant bit of the tack number of a certain servo area and FIG. 7 shows a portion of tracks of DTM to which a magnetic head is accessed.

FIG. 6 shows a read signal obtained along a radial direction axis corresponding to the LSB of the track number in a certain servo area.

The read signal 27 is read along a radial direction axis corresponding to the LSB of the track number in a certain servo area and S is the judgment slice level thereof. The peak value of the read signal 27 becomes smaller than the slice level S at a magnetic film defect as shown in FIG. 6.

In FIG. 6, a symbol ● shows a point corresponding to zero cross point Cr of the slice level SL of the peak waveform shown in FIGS. 4(a) and 4(b). When the data which is obtained as the read signal is in a the middle of the period, it is possible to exclude a waveform portion of an incomplete peak value by providing a mask shown by a rectangular dotted framework 28 in a left end to mask the end. Therefore, it is possible to reduce the judgment error by the judgment slice level S.

On the other hand, when the judgment in Step 111 is NO, the MPU 21 judges whether or not the read signal in the track number position is ended (Step 112). When the judgment in Step 112 is NO, the operation is returned to Step 110 to extract the read signal of a next stage position in radial direction and store it in the working region 22h (Step 110), and the judgment is Step 111 is repeated.

When the judgment in Step 112 is YES, the MPU 21 judges whether or not the judgment of all servo areas in the circular direction is ended (Step 113) and, when the judgment in the Step 113 is NO, the servo area is updated and takes a track number position of a next servo area stored in the memory (Step 114) and the operation is returned to Step 110. When the judgment in Step 113 is YES, the MPU 21 judges whether the test is ended completely (Step 115). When the judgment in Step 115 is NO, the measuring range is updated (Step 116) and the operation is returned to Step 101 and continued from Step 101. The MPU 21 repeats this test processing until the test end key of the DTM 1 is inputted from the key board, or until the defect test of the DTM 1 is ended.

When the judgment in Step 115 is YES, the MPU 21 judges that the DTM 1 is determined as qualification and then the qualification processing is performed to store it in a qualification cassette.

Incidentally, the extraction of the read signal of the track number position in radial direction in Step 110 and the judgment in Step 111 may be only the read signal of the position of LSB of the track number position. In such case, the processing in Step 112 is unnecessary.

This is because, in the position of the LSB of this track number, the period of the bit pattern constructed with "0" and "1" are repeated.

In the position of the LSB of this track number, a magnetic film having narrow width which alternates correspondingly to the "0" and "1" bits in the radial direction. In the position of LSB of the track number in the servo area stamped from the original disk, defect may occur. Therefore, at least this region is used as an object of test. As mentioned hereinbefore, it can be considered that the substantial test of servo area is made by testing the read signal in radial direction corresponding to the position of LSB of at least the track number.

Incidentally, in Step 110, the read signals in the radial direction of the track number positions of 16 bits indicating the track number position are serially and continuously extracted along the axis of the radial direction and stored in the memory 22 and these read signals may be tested at once. In such case, Step 112 becomes unnecessary.

As described, the detection of the track number position may be done by displaying the binary image 25 on the CRT display 24, selecting them by a human operator and inputting the position data to the data processing control device 20 through a keyboard, etc.

It is possible to test the servo area by using DTM 1 which is preliminarily erased. Therefore, the DC erasing process performed in Steps 101~103 in FIG. 2 becomes unnecessary for DTM 1. In such case, Steps 101~103 can be deleted.

The invention claimed is:

1. A servo area testing method for a magnetic recording medium of ∈ discrete track system, a magnetic recording medium of a bit pattern system or a magnetic recording medium having a recording layer of uneven pattern, comprising the steps of positioning a magnetic head in a DC erased designated track of the rotating magnetic recording medium, moving the magnetic head in a radial direction of the magnetic recording medium across a plurality of DC erased tracks including the designated track and reading a signal for one track round by the magnetic head according to a read start signal corresponding to respective moving position in the radial direction, A/D converting the read signal for the one track round to a digital value and storing the digital value in a memory correspondingly to the respective moving positions in the radial direction, obtaining the read signal for the revolution of a plurality of the tracks from the memory and canceling jitter in the track direction of each of the read signals corresponding to the respective servo areas of one track revolution in the read signals for the plurality of track revolutions, binary-coding the read signal for each track revolution, jitter of which is cancelled, by a designated slice level and generating a binary image data an image of which has one axis corresponding to the moving position in the radial direction and the other axis corresponding to a circumferential direction of the magnetic recording medium, detecting, from the binary image data, a position of the track number in each servo area, and testing each servo area by judging a defect of the servo area on the basis of the read signal in the radial direction stored in the memory corresponding to the least significant bit of at least the track number in the position of the track number in each servo area.

2. A servo area testing method for a magnetic recording medium claimed in claim 1, wherein the jitter canceling step includes the step of obtaining the plurality of read signals corresponding to the moving position in the radial direction every servo area and the step of setting a position of at least one transition point in the timings corresponding to the read signals.

3. A servo area testing method for a magnetic recording medium claimed in claim 2, wherein the position setting of the transition point in the read signals in the step of canceling jitter is performed by setting a timing position corresponding to the designated timing position of the selected read signal in a position crossing a slice level in a center of amplitude of the read signal selected from the read signals in a timing position corresponding to the designated timing position of the remaining read signals.

4. A servo area testing method for a magnetic recording medium claimed in claim 2, further comprising the step of track-erasing for rotating the magnetic recording medium for DC erasing or DC erased of a plurality of tracks, wherein the step of generating the binary coded image data is to binary coding each of the read signals of the plurality of the track revolutions in each of the servo areas by using each of the slice levels.

5. A servo area testing method for a magnetic recording medium claimed in claim 2, wherein the A/D conversion is performed for a voltage value of the read signal from the designated track and the judgment of defect is performed by the designated slice level in the read signal in the radial direction.

6. A servo area testing method for a magnetic recording medium claimed in claim 5, wherein the read signal in the radial direction corresponding to the least significant bit detects a portion of the binary-coded image data, in which a period of the bit pattern with repeated "0" and "1" is shortest as a least significant bit.

7. A servo area testing method for a magnetic recording medium claimed in claim 5, wherein the read signal in the radial direction corresponding to the least significant bit is detected in the position of the least significant bit in the binary-coded image data and the detection of the position of the least significant bit is selected from the image displayed on the basis of the binary-coded image data and the position is inputted as the data.

8. A servo area testing device for a magnetic recording medium of a discrete track system, a magnetic recording medium of a bit pattern system or a magnetic recording medium having a recording layer of uneven pattern, comprising a magnetic head, an amplifier receiving a read signal from the magnetic head, an A/D converting circuit for A/D converting the read signal from the amplifier and a data processing device, wherein the data processing device includes     magnetic head positioning means for positioning a magnetic head in a DC erased predetermined track of the rotating magnetic recording medium,     signal read means for reading a signal for one track revolution by the magnetic head according to a read start signal corresponding to respective moving position in the radial direction by moving the magnetic head in a radial direction of the magnetic recording medium across a plurality of DC erased tracks including the designated track,     read signal storing means for storing the digital value in a memory correspondingly to the respective moving positions in the radial direction by A/D converting the read signal for the one track revolution through the A/D conversion circuit,     jitter canceling means for canceling jitter in a track direction of each of the read signals corresponding to each of servo areas for one track revolution in the read signals for a plurality of track revolutions,     binary-coded image data generating means for generating binary coded image data an image of which has one axis corresponding to the moving position in the radial direction and the other axis corresponding to a circumferential direction of the magnetic recording medium, by binary-coding the read signal for each track revolution, jitter of which is cancelled, by a designated slice level and generating a binary image data,     track number position detecting means for detecting a position of the track number in each servo area from the binary-coded image data, and     servo area testing means for testing each servo area by judging a defect of the servo area on the basis of the read signal in the radial direction stored in the memory correspondingly to at least the least significant bit of the track number in the position of the track number in each servo area.

9. A servo area testing device as claimed in claim 8, wherein the jitter canceling means obtains the plurality of read signals corresponding to the moving position in the radial direction every servo area and sets a position of at least one transition point in the timings corresponding to the read signals.

10. A servo area testing device as claimed in claim 9, wherein the position setting of the transition point in the read signals by the jitter canceling means is performed by setting a timing position corresponding to the designated timing position of the selected read signal in a position crossing a slice level in a center of amplitude of the read signal selected from the read signals in a timing position corresponding to the designated timing position of the remaining read signals.

11. A servo area testing device claimed in claim 9, further comprising track erasing means for rotating the magnetic recording medium having DC erasing or DC erased tracks, wherein the binary-coded image data generating means binary codes each of the read signals in each of the servo areas for the read signals for one track revolutions by slice levels.

12. A servo area testing device claimed in claim 11, wherein the A/D converting circuit A/D-converts the voltage value of the read signal from the designated track and the servo area testing means performs the judgment of the defect by setting a designated slice level of the read signal in the radial direction.

13. A servo area testing device claimed in claim 12, wherein the read signal in the radial direction corresponding to the least significant bit is obtained by detecting a portion of the binary-coded image data, in which a period of the bit pattern with repeated "0" and "1" is shortest, as a least significant bit.

14. A servo area testing device claimed in claim 12, wherein the read signal in the radial direction corresponding to the least significant bit is detected by detecting the position of the least significant bit in the binary-coded image data and the position of the least significant bit is detected by selecting in the image displayed on the basis of the binary-coded image data and inputting the position as a data.

\* \* \* \* \*